(12) United States Patent
Tulloch et al.

(10) Patent No.: US 11,873,855 B2
(45) Date of Patent: Jan. 16, 2024

(54) BARREL NUT RETAINER

(71) Applicant: AIRBUS OPERATIONS LIMITED, Bristol (GB)

(72) Inventors: William Tulloch, Bristol (GB); Paul Dean, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 370 days.

(21) Appl. No.: 17/215,847

(22) Filed: Mar. 29, 2021

(65) Prior Publication Data

US 2021/0301858 A1 Sep. 30, 2021

(30) Foreign Application Priority Data

Mar. 30, 2020 (GB) .................................. 2004574

(51) Int. Cl.
| | | |
|---|---|---|
| F16B 37/04 | (2006.01) | |
| F16B 39/24 | (2006.01) | |
| F16B 41/00 | (2006.01) | |

(52) U.S. Cl.
CPC .......... *F16B 37/047* (2013.01); *F16B 37/044* (2013.01); *F16B 37/046* (2013.01); *F16B 39/24* (2013.01); *F16B 37/04* (2013.01); *F16B 41/002* (2013.01)

(58) Field of Classification Search
CPC .................... F16B 5/0208; F16B 37/04; F16B 37/044–046; F16B 37/047; F16B 37/065; F16B 39/24; F16B 41/002; Y10S 411/97; Y10S 411/969
USPC ........................ 411/103, 104, 105, 111–113
See application file for complete search history.

(56) References Cited

U.S. PATENT DOCUMENTS

| | | | |
|---|---|---|---|
| 2,809,686 A | | 10/1957 | Shepherd |
| 2,825,379 A | | 3/1958 | Becker |
| 2,903,035 A | | 9/1959 | Davenport et al. |
| 3,081,809 A | * | 3/1963 | Rohe ..................... F16B 37/047 |
| | | | 411/104 |
| 3,205,927 A | * | 9/1965 | Phelan .................. F16B 37/047 |
| | | | 411/104 |
| 3,512,328 A | | 5/1970 | Eriksson |
| 3,787,131 A | | 1/1974 | Reachek |
| 4,783,189 A | * | 11/1988 | Bugg ..................... F16B 7/046 |
| | | | 403/264 |
| 4,861,182 A | | 8/1989 | Gillet |

(Continued)

FOREIGN PATENT DOCUMENTS

| | | |
|---|---|---|
| DE | 10 2013 110983 | 4/2015 |
| GB | 2 223 815 | 4/1990 |

OTHER PUBLICATIONS

Extended European Search Report for European Application No. 21163898.6, seven pages, dated Jul. 16, 2021.

(Continued)

*Primary Examiner* — Roberta S Delisle
(74) *Attorney, Agent, or Firm* — Nixon & Vanderhye P.C.

(57) ABSTRACT

A barrel nut retainer for retaining a barrel nut in a bore of a component is disclosed having a body adapted to fit within a bore and extending between a first end and a second end, and wherein the body has an aperture between the first end and second end configured to receive a barrel nut, and a head portion at the first end of the body, the head portion adapted to sit over an open end of the bore.

18 Claims, 8 Drawing Sheets

(56) References Cited

U.S. PATENT DOCUMENTS

| | | | | |
|---|---|---|---|---|
| 4,861,207 A * | 8/1989 | Do | ................ | F16B 37/047 |
| | | | | 411/970 |
| 4,886,407 A * | 12/1989 | Harbin | ................ | F16B 37/047 |
| | | | | 411/970 |
| 4,998,701 A | 3/1991 | Rawald | | |
| 5,032,047 A * | 7/1991 | Theakston | ............ | F16B 37/047 |
| | | | | 411/432 |
| 5,171,099 A | 12/1992 | Westre | | |
| 7,959,392 B2 * | 6/2011 | Cooley | ................ | F16B 37/041 |
| | | | | 411/332 |
| 8,152,426 B2 * | 4/2012 | Marczynski | .......... | F16B 39/103 |
| | | | | 411/14 |
| 11,306,762 B2 * | 4/2022 | Gormley | ............ | F16B 37/044 |
| 2002/0187019 A1 * | 12/2002 | Campbell | ............ | F16B 2200/95 |
| | | | | 411/13 |
| 2009/0285652 A1 * | 11/2009 | Williams | ............ | F16B 39/2825 |
| | | | | 403/24 |

OTHER PUBLICATIONS

Combined Search and Examination Report for GB2004574.6 dated Jul. 13, 2020, 5 pages.

* cited by examiner

BARREL NUT RETAINER

CROSS REFERENCE TO RELATED APPLICATION

This application claims priority to United Kingdom Patent Application GB 2004574.6, filed Mar. 30, 2020, the entire contents of which is hereby incorporated by reference.

FIELD OF THE INVENTION

The present invention relates to a barrel nut retainer, a barrel nut assembly including the retainer and a barrel nut, an assembly including a component having the barrel nut assembly therein, and a method for assembling an aircraft assembly.

BACKGROUND OF THE INVENTION

Barrel nuts are used in a number of applications, particularly in the aerospace industry, where it is either undesirable for the tail end of a fastener to protrude through the surface of a component or where there are no accessible opposing surfaces between which a nut may be tightened onto the fastener.

Assembly generally involves placing the barrel nut into the bore of a component, such that a threaded through-hole of the barrel nut aligns with a fastener passing through the component. As rotation of the barrel nut relative to the longitudinal axis of the fastener is restricted by the fastener, the barrel nut is able to tighten onto the fastener.

However, whilst rotation of the barrel nut relative to the longitudinal axis of the fastener is restricted when attached to a fastener, when the barrel nut is not attached to a fastener the barrel nut is free to rotate relative to its longitudinal axis and to translate along the bore into which it is placed. This makes alignment of the barrel nut with the fastener difficult and time-consuming.

SUMMARY OF THE INVENTION

A first aspect of the invention provides a barrel nut retainer for retaining a barrel nut in a bore of a component, the retainer comprising: a body adapted to fit within a bore and extending between a first end and a second end, and wherein the body has an aperture between the first end and second end configured to receive a barrel nut, and a head portion at the first end of the body, the head portion adapted to sit over an open end of the bore.

A further aspect of the invention provides a barrel nut assembly, comprising: the barrel nut retainer; and a barrel nut located in the aperture.

A further aspect of the invention provides an assembly, comprising: a component with a first bore and a second bore perpendicular to the first bore, the barrel nut assembly insertable into the first bore, and a bolt insertable into the second bore to threadingly engage with a threaded through-hole in the barrel nut.

A further aspect of the invention provides a method for assembling an aircraft assembly, comprising: providing a first component having a first bore and a second bore perpendicular to the first bore and intercepting the first bore at a depth of the first bore, selecting a barrel nut retainer according to any preceding claim, wherein the barrel nut retainer is selected based on the depth of the first bore at which the second bore intercepts the first bore, inserting a barrel nut into the barrel nut retainer, inserting the barrel nut retainer and barrel nut into the first bore until the head portion sits over an open end of the first bore and a threaded through-hole of the barrel nut aligns with the second bore.

A barrel nut is a nut with a body having a threaded through-hole extending through the body perpendicular to its longitudinal axis. The barrel nut is typically fitted inside a first bore of a first component such that a threaded fastener (e.g. a bolt) can be passed through a hole in a second component, a second bore of the first component perpendicular and intercepting the first bore, and into the threaded through-hole of the barrel nut installed in the first bore of the first component in order to fasten the second component to the first component.

The barrel nut retainer allows barrel nuts to be (pre)-installed within components and sub-assemblies at earlier stages of the supply line, thereby potentially saving significant amounts of time during the final stages of assembly. The barrel nut is securely retained in the component by the retainer, so the number of separate parts in the assembly process can be reduced. This retainer can also prevent foreign objects from entering the bore into which the barrel nut is installed prior to assembly. The barrel nut retainer allows existing barrel nuts to be used without needing to modify the design of existing barrel nuts, such that an off-the-shelf barrel nut can be selected and used in a given bore without the need to enlarge or otherwise modify the bore into which the barrel nut is placed. The head portion ensures the barrel nut is positioned in the desired axial position in the bore, and can thereby easily be aligned with a corresponding fastener.

Optionally, the head portion is configured to cover the open end of the bore to prevent ingress of debris to the bore.

Optionally, the head portion includes a tool engagement portion for engaging with a tool. With this arrangement, the retainer and barrel nut retained within the retainer can easily be rotated to rotationally align the barrel nut with its corresponding fastener.

Optionally, the head portion includes an orientation indicator for indicating the orientation of a barrel nut retained by the retainer with respect to the bore.

Optionally, the aperture is configured to releasably engage the barrel nut.

Optionally, the aperture has dimensions configured to form an interference fit with the barrel nut.

Optionally, the body includes a shoulder extending between the first and second ends of the body, wherein the shoulder includes a through-hole perpendicular to a longitudinal axis extending between the first and second ends of the body, the through-hole configured to align with a corresponding threaded through-hole of the barrel nut.

Optionally, the through-hole is equidistant from the first and second ends of the body.

Optionally, the aperture includes a recess for receiving a protrusion of the barrel nut. The cooperating recess and protrusion may align the barrel nut in the aperture of the retainer.

Optionally, the barrel nut retainer comprises a tail portion at the second end of the body, wherein the tail portion is a clip configured to move between: a first configuration in which the diameter of the clip is substantially the same or less than the diameter of the body such that the retainer is moveable through the bore, and a second configuration in which the diameter of the clip is greater than the diameter of the body such that the tail portion is operable to locate the retainer with respect to the bore. Optionally, the clip in the second configuration is adapted to sit over a second open end of the bore opposing the first open end. With this arrangement, the retainer can be releasably fitted inside a through-hole.

Optionally, the clip is a spring clip biased towards the second configuration. With this arrangement, the tail portion can move between the first and second configurations when entering and/or exiting the bore in the component without needing direct manipulation or access to the clip, e.g. when the retainer is to be located in a blind bore or a through-bore without access to the far end. The retainer can simply be pushed into the bore.

Optionally, the barrel nut retainer comprises plastics material. Plastics are typically light and inexpensive materials that can be made in large quantities quickly and to acceptable tolerances.

Optionally, the barrel nut retainer is manufactured by additive layer manufacturing or injection moulding.

Optionally, the retainer is integrally formed, preferably as a single component. By forming the retainer as a single-piece component, there are no auxiliary parts that may get lost or misplaced during assembly.

Optionally, the component has a pair of opposing faces and the first bore is a through-hole extending between the pair of opposing faces, wherein the head portion and the tail portion are each configured to engage a respective one of the pair of opposing faces.

Optionally, the assembly is an aircraft assembly and the component is an aircraft component. The retainer is particularly advantageous in an aircraft assembly process, in part due to the ability to pre-install the barrel nut in an aircraft component (which may form part of an aircraft assembly or sub-assembly) prior to joining the aircraft component to another aircraft component. This may be particularly advantageous where the component having the barrel nut retained is a supplier part or is shipped/transported to another location for joining to another component.

Optionally, the assembly is an automotive assembly and the component is an automotive component. The retainer is particularly advantageous to automotive assemblies, in part due to the fast moving supply chain and assembly process.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
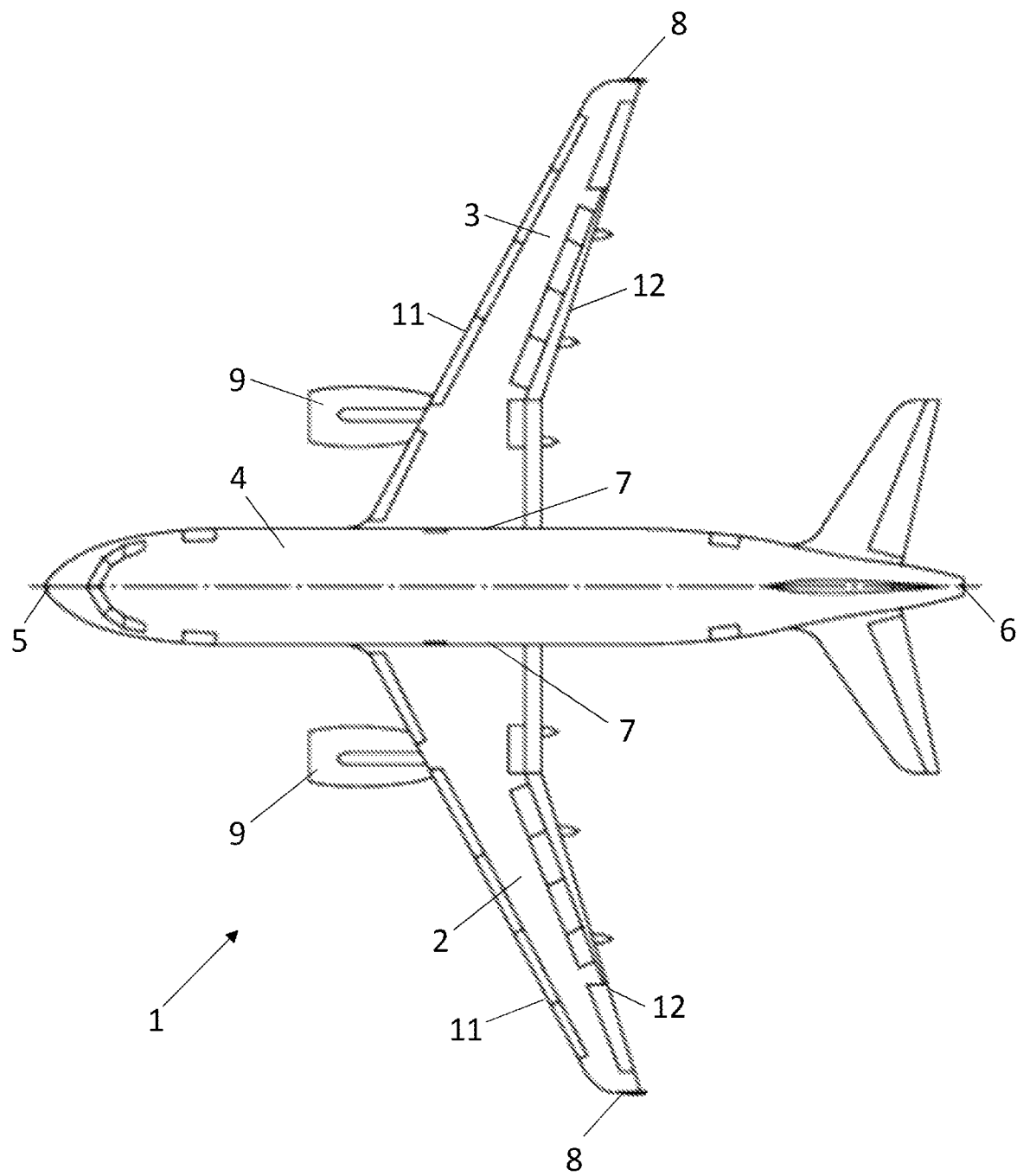
FIG. 1 shows a plan view of an aircraft.

FIG. 1 shows an aircraft 1 with port and starboard fixed wings 2, 3, and a fuselage 4 with a nose 5 and a tail 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines 9 attached to the wings or fuselage.

Each wing 2, 3 has a cantilevered structure with a length extending in a span-wise direction from a wing root 7 to a wing tip 8, the wing root 7 being joined to the fuselage 4. The wings 2, 3 are similar in construction so only the port wing 2 will be described in detail with reference to the following Figures.

In the following description, the term "front" refers to components towards a leading edge 11 of the wing, and the term "rear" refers to components towards a trailing edge 12 of the wing. The terms "forward" and "rearward" should be construed accordingly. The position of features may be construed relative to other features, for example a forward component may be disposed on a forward side of another component, but towards the rear of the vehicle. Similarly, the terms "upper" and "lower" refer to the position of features relative to other features and in accordance with a normal orientation of the aircraft 1.

Figure 2A:
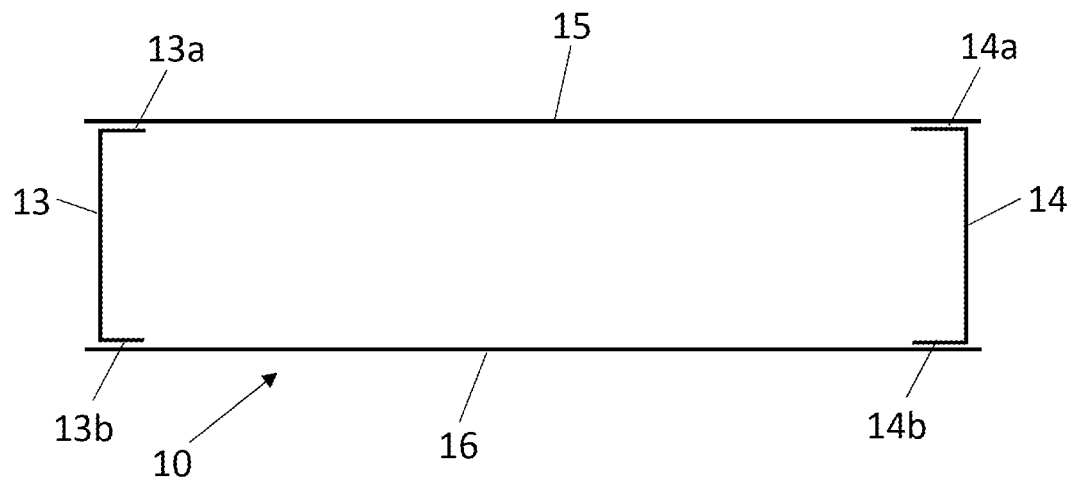
FIG. 2A shows a wing box having an aft spar with forward facing flanges

FIG. 2A shows a schematic view of a wing box 10 of the port wing 2 of an aircraft 1. The wing box 10 is a support structure arranged to support a significant proportion of the loads on the wing 2. The wing box 10 has a forward spar 13, an aft spar 14, an upper cover 15, and a lower cover 16 each extending substantially the entire length of the wing 2. The upper cover 15 and lower cover 16 have outer aerodynamic surfaces. The wing 3 also includes a leading edge structure (not shown) and a trailing edge structure (not shown) that are aerodynamically shaped to combine with the wing box 10 to form an aerofoil shaped body.

The forward spar 13 and aft spar 14 are 'C-shaped', each spar 13, 14 including inward facing flanges 13a, 13b, 14a, 14b that provide attachment portions for attaching the spars 13, 14 to the covers 14, 16. 'Inward facing' refers to the flanges extending towards the centre of the wing box 10, such that the flanges 13a, 13b of the forward spar 13 extend aft towards a trailing edge 12 of the wing 2 and the flanges 14a, 14b of the aft spar 14 extend forward towards a leading edge 11 of the wing 2.

Figure 2B:
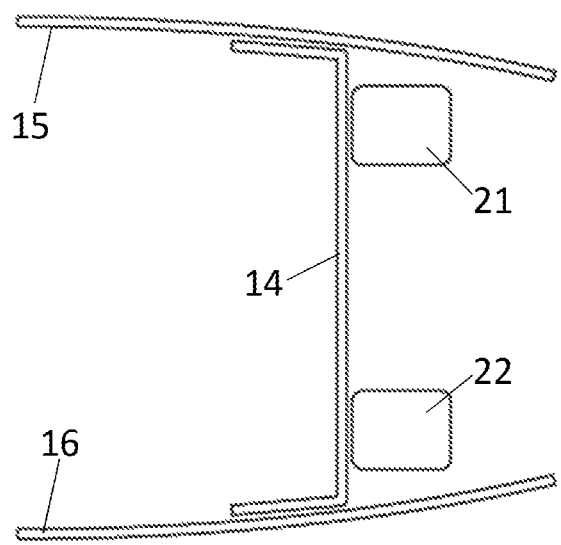
FIG. 2B shows an aft section of the wing box having an aft spar with forward facing flanges.

FIG. 2B shows a schematic of an aft section of the wing box 10, in which attachment brackets 21, 22 of a control surface actuation mechanism are connected to the rear spar 14.

Typically, the attachment brackets 21, 22 and any other systems and movable structures, are connected to the aft spar 14 after the wing box 10 has been assembled with the aft spar 14 connected to the upper and lower covers 15, 16. As a result, space within the region aft of the spar 14 is limited and this can make fitting/attaching the systems challenging.

Figure 3A:
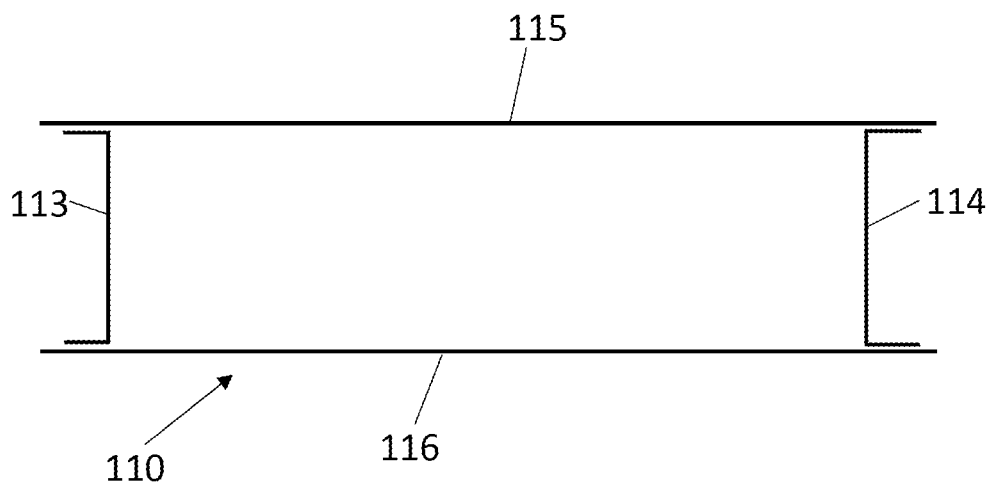
FIG. 3A shows a wing box having an aft spar with rearward facing flanges.

FIG. 3A shows a schematic view of a wing box 110 according to a second example, in which the forward spar 113 and aft spar 114 each include outward facing flanges 113a, 113b, 114a, 114b that provide attachment portions for attaching the spars 113, 114 to the covers 114, 116. 'Outward facing' refers to the flanges extending away from the centre of the wing box 10, such that the flanges 113a, 113b of the forward spar 113 extend forwards towards a leading edge 11 of the wing 2 and the flanges 114a, 114b of the aft spar 114 extend aft towards a trailing edge 12 of the wing 2.

An advantage of outward facing flanges 113a, 113b, 114a, 114b on the spars 113, 114 is that it enables fastening of the spars 113, 114 to the covers 115, 116 from outside of the wing box 110.

Figure 3B:
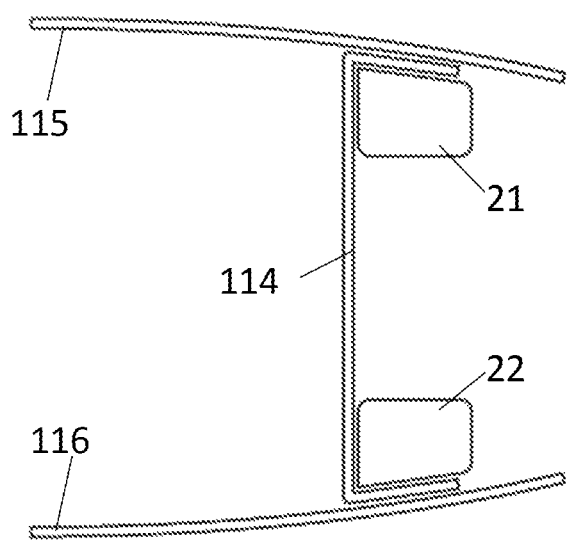
FIG. 3B shows an aft section of the wing box having an aft spar with rearward facing flanges.

A consequence of this, is that space is further reduced in the vicinity of the spars 113, 114 in which to attach aircraft systems. For example, FIG. 3B shows a schematic of an aft section of the wing box 110, in which attachment brackets 21, 22 of a control surface actuation mechanism are connected to the rear spar 114. As such, it may not be feasible or possible to utilise standard nut and bolt fasteners.

Figure 4:
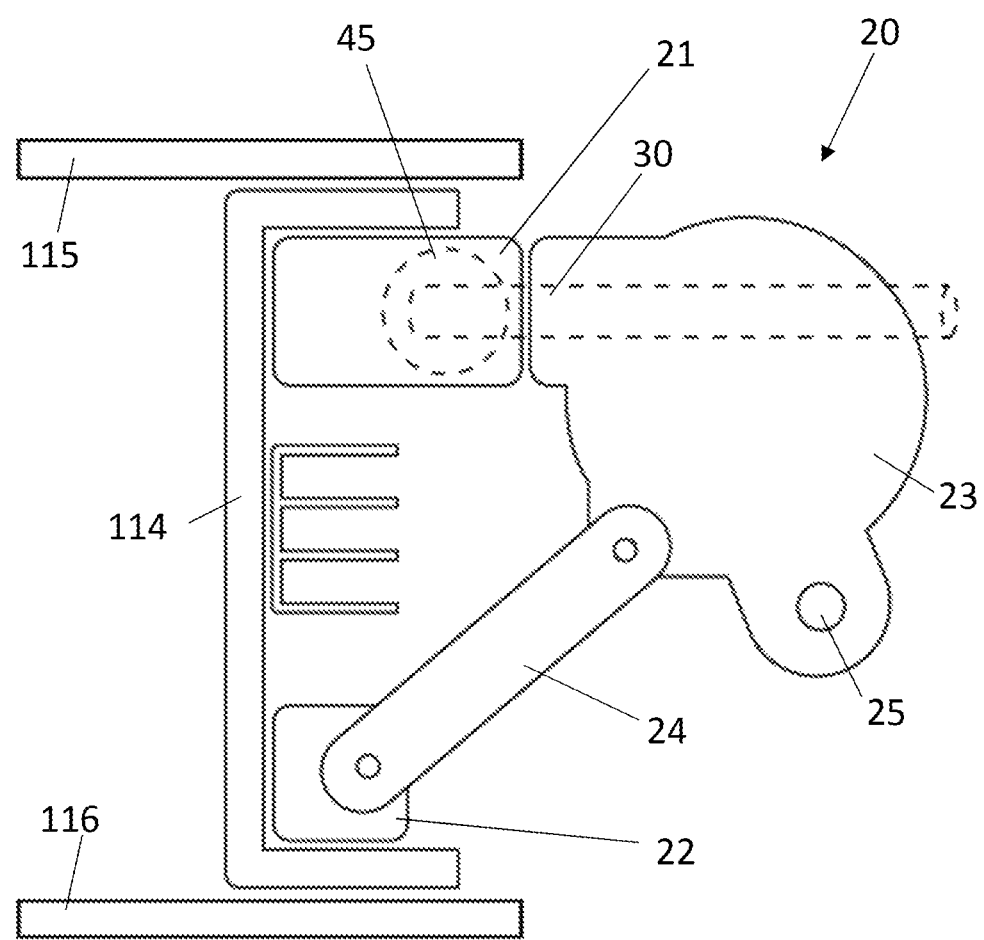
FIG. 4 shows a control surface actuation mechanism attached to a wing box.

FIG. 4 shows a control surface actuation mechanism 20, e.g. a control mechanism for a flap or aileron, coupled to the attachment brackets 21, 22. The control surface actuation mechanism 20 includes an actuator 23 attached to the upper attachment bracket 21, and a linkage 24 rotatably coupled between the lower attachment bracket 22 and the actuator 23. The actuator 23 includes an attachment portion 25 for attaching to a control surface.

The connection between the actuator 23 and the upper attachment bracket 21 is achieved via a captive nut solution. A fastener 30 extends through the actuator 23 and into a barrel nut (not shown) held captive within a bore 45 of the upper attachment bracket 21.

A barrel nut and fastener combination is required due to the limited access to the upper rearward portion of the wing box 110, and in particular the lack of opposing surfaces upon which to tighten a nut onto the fastener 30.

The connection is formed by inserting the barrel nut into the bore 45 of the upper attachment bracket 21, inserting the fastener 30 through a bore in the actuator 23 and upper attachment bracket 21, wherein the fastener bore connects with and is perpendicular to the bore 45 into which the barrel nut is inserted. In this manner, the fastener 30 can be inserted into a threaded through-hole of the barrel nut. As rotation of the barrel nut relative to the longitudinal axis of the fastener is restricted by the fastener, when the fastener is inserted through the barrel nut, the barrel nut is able to tighten onto the fastener.

However, whilst rotation of the barrel nut relative to the longitudinal axis of the fastener is restricted when attached to a fastener, when the barrel nut is not attached to a fastener, the barrel nut is free to rotate about its own longitudinal axis and to translate along the bore into which it is placed. This makes alignment of the barrel nut with the fastener difficult and time-consuming. The restricted access at the aft portion of the wing box 110 shown in FIG. 4 also means that manipulation of the barrel nut within the bore is made even more challenging.

There is also a risk that the barrel nut will slide out of the bore and be lost, which is a particular concern with aircraft assemblies.

Figure 5:
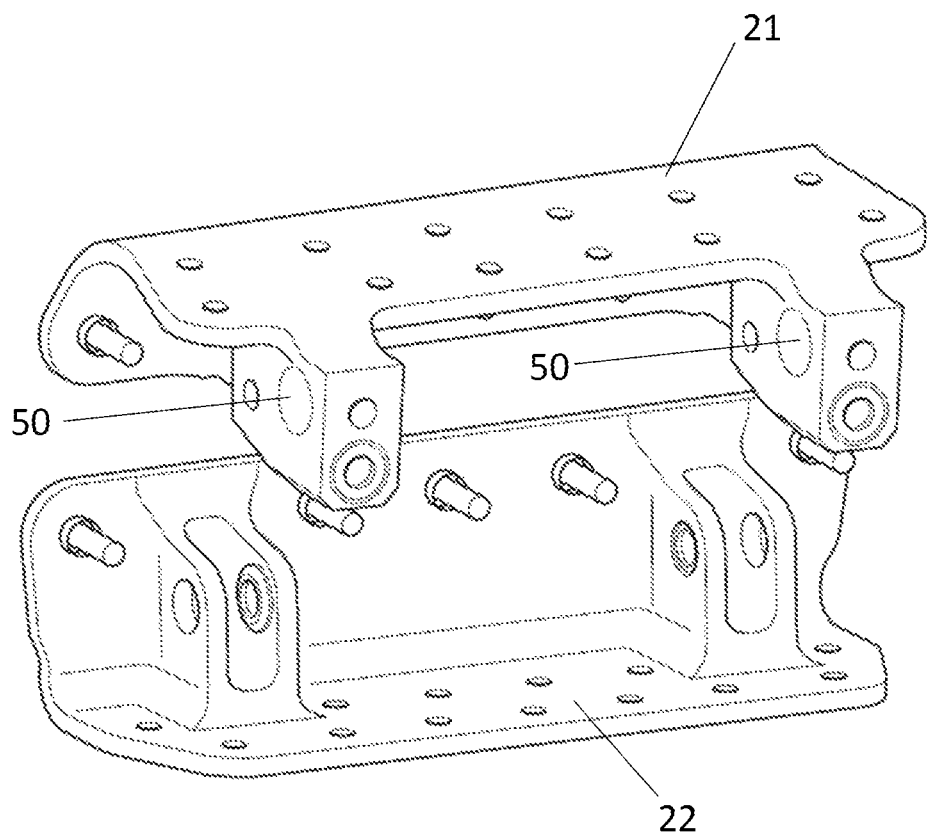
FIG. 5 shows part of the control surface actuation mechanism.

FIG. 5 shows a perspective view of the attachment brackets 21, 22, in which two barrel nut retainers 50 according to a first example are shown. The barrel nut retainers 50 are designed to retain a barrel nut in a bore of the first attachment bracket 21.

The design of the barrel nut retainer 50 ensures that the retainer is able to retain a barrel nut without needing to modify the design of existing barrel nuts, such that an off-the-shelf barrel nut can be selected, and without enlarging or otherwise modifying the bore into which the barrel nut is placed. Furthermore, the barrel nut retainer 50 includes a number of features to ensure a barrel nut retained by the barrel nut retainer 50 can be positioned in the desired axial and rotational position, and can thereby be easily aligned with a corresponding fastener. The barrel nut retainer 50 ensures that the barrel nut is fixed within the bore of a component, and further enables barrel nuts to be installed within components and sub-assemblies at earlier stages of the supply line, thereby potentially saving significant amounts of time during the final stages of assembly as the component is pre-installed with the barrel nut and can be physically transported around the supply chain.

Figure 6:
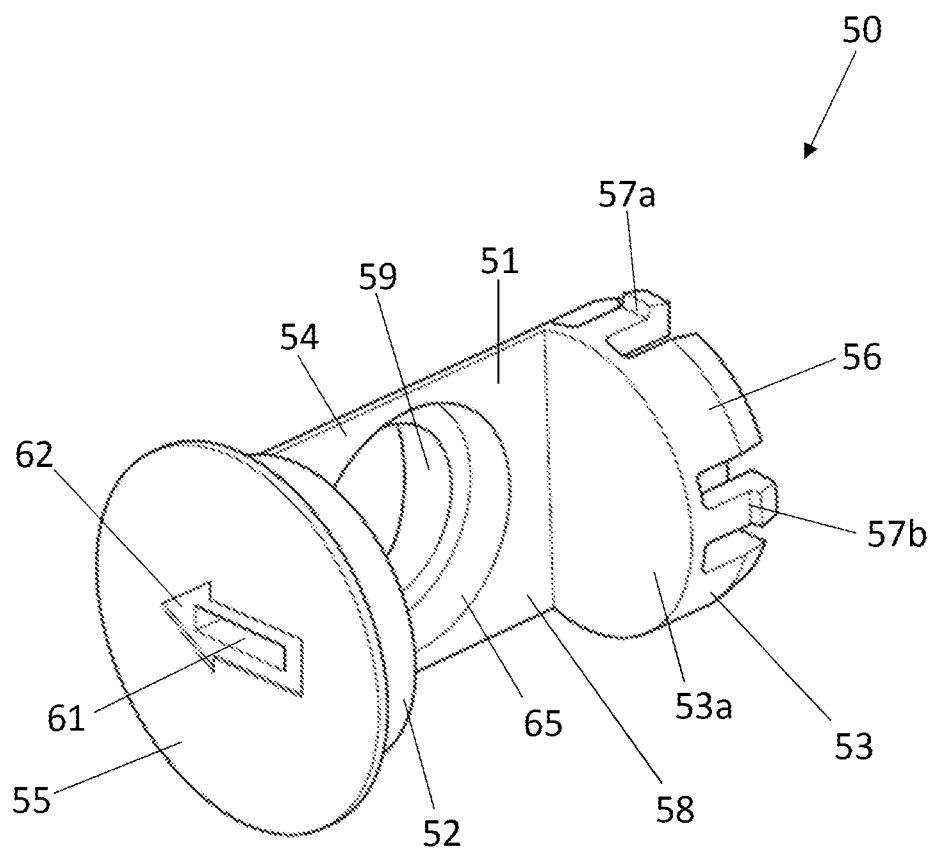
FIG. 6 shows a barrel nut retainer according to a first example.

The barrel nut retainer 50 is shown in FIG. 6. The barrel nut retainer 50 is made of acrylonitrile butadiene styrene (ABS) and is manufactured by additive layer manufacturing.

The barrel nut retainer 50 includes a cylindrical body 51 adapted to provide an interference fit within the bore of a component. The body 51 extends along a longitudinal axis of the retainer between a first end 52 and a second end 53, with an aperture 54 between the first end 52 and the second end 53 into which a barrel nut is configured to be received. At the first end 52 of the aperture 54 is a first end face (not shown). At the second end of the aperture 54 is a second end face 53a. The first end face and second end face 53a are opposing faces normal to the longitudinal axis of the retainer 50 and configured to engage corresponding ends of a barrel nut received in the aperture 54.

The aperture 54 is arranged to form an interference fit with a barrel nut, such that the barrel nut is held between the first and second ends 52, 53 of the barrel nut retainer 50 but is releasable when required. For example, the barrel nut may be removed from the retainer 50 manually by a user.

A head portion 55 is positioned at the first end 52 of the body 51. The head portion 55 is arranged to sit over the open end of a bore, completely covering the opening to the bore. This, along with the interference fit of the retainer 50 in the bore, assists in preventing ingress of debris into the bore.

The head portion 55 includes a recess 61 that functions as a tool engagement portion to which a tool, such as a screwdriver or other means, can be fitted and enable rotation of the retainer 50 within the bore.

Surrounding the recess 61 of the head portion 55 is an inscribed arrow 62, which indicates the orientation of the barrel nut retainer 50. This allows the orientation of a barrel nut held by the retainer 50 to be determined, such that it can be more easily aligned with a fastener.

The body includes a shoulder 58 extending between the first and second ends 52, 53 of the body. Equidistant between the first and second ends 52, 53 is a through-hole 59 perpendicular to the longitudinal axis of the body 51, which is arranged to align with a corresponding threaded through-hole of a barrel nut.

The aperture 54 includes a recess 65 enveloping the through-hole 59, and configured to receive a correspondingly shaped portion of a barrel nut, thereby assisting in the retention of the barrel nut in the retainer 50.

A tail portion 56 is positioned at the second end 53 of the body 51. The tail portion 56 is a clip configured to be movable between first and second configurations, with spring clip elements 57a, 57b (only two of which are shown in FIG. 6, although the tail portion 56 may include two, three, four, or more) disposed radially around the longitudinal axis of the retainer 50. The spring clip elements 57a, 57b extend outside the radial extent of the sections of body 51 between the head and tail portions 55, 56, such that the diameter of the tail portion 56 is greater than the diameter of these sections of the body 51 when the tail portion 56 is unconstrained, but are able to flex elastically to reduce the diameter of the tail portion 56 when necessary, as will be explained in relation to FIGS. 7A and 7B.

Figure 7A:
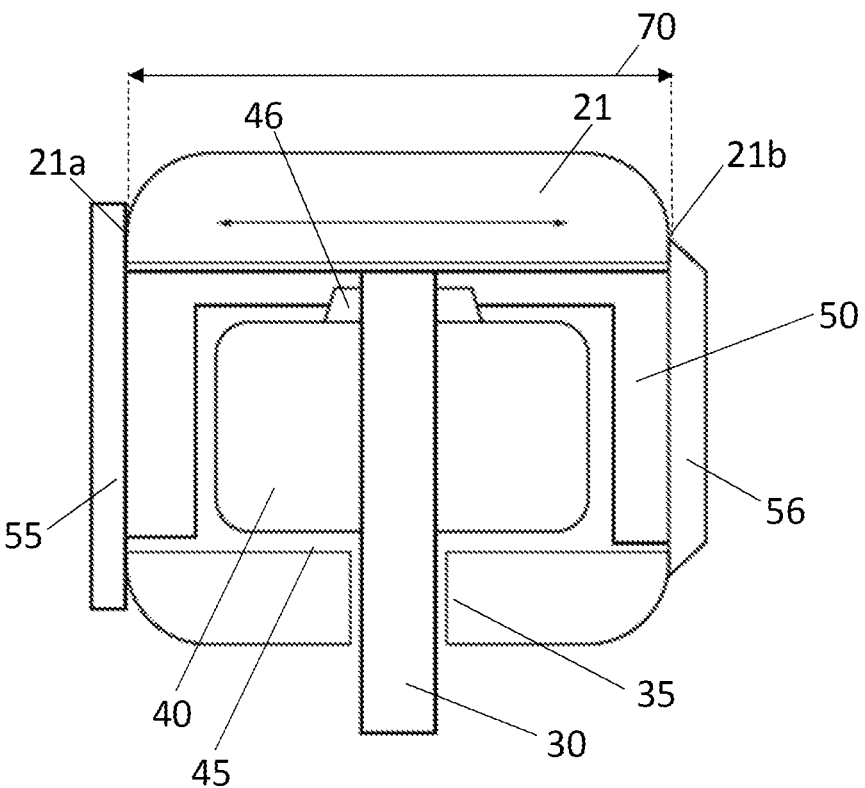
FIG. 7A shows a side view of the barrel nut retainer inside a hole of the control surface actuation mechanism.

FIG. 7A shows a barrel nut retainer 50 and barrel nut 40 received within the bore of a component, in this case the upper attachment bracket 21 shown in FIGS. 4 and 5.

The assembly of, e.g. an aircraft assembly, is achieved by inserting the barrel nut 40 into the aperture 54 of the retainer 50, such that the barrel nut 40 is held by the interference fit of the aperture 54 with the barrel nut 40. The barrel nut 40 may also, in part, be held in the retainer 50 by the placement of a protrusion 46 into the recess 65 of the aperture 54 discussed previously.

The retainer 50 is then placed into a bore 45 on a first side 21a of the component 21, by inserting the tail portion 56 first. In doing so, the clip elements 57a, 57b (shown in FIG. 6) flex relative to the body 51 of the retainer 50 such that the tail portion 56 is constrained by the walls of the bore and the diameter of the tail portion 56 reduces to the diameter of the bore. This ensures the retainer 50 can be inserted through the bore without damaging the bore or the retainer 50.

The bore 45 is a through-hole, such that the retainer 50 can be inserted right through the bore until the tail portion 56 exits upon a second side 41 of the bore, at which point the clip elements 57a, 57b are once again unconstrained and are able to spring back to their nominal diameter, which is greater than the diameter of the bore. In doing so, the body 51 is locked inside the bore until the spring clip elements 57a, 57b, are again flexed to reduce the diameter of the tail portion 56. When the retainer 50 is locked inside the bore 45, the tail portion 56 is arranged to sit over the open end of the bore 45, covering the opening to the bore in order to prevent ingress of debris into the bore.

As shown in FIG. 7A, the retainer 50 is thereby fixed between the head portion 55 and the tail portion 56, locking the longitudinal position of the retainer 50 and barrel nut 40 inside the bore 45.

The position of the barrel nut 40 in the bore 45 is determined by the dimensions of the retainer 50, i.e. the position of the aperture 54 relative to the first and second sides 21a, 21b of the component 21 determines the position of the barrel nut 40 relative to those same sides 21a, 21b.

The retainer 50 is therefore selected based on the total depth 70 of the bore 45 (i.e. the depth of the bore 45 measured between the first and second sides 21a, 21b—See FIG. 7A), such that the distance between the head portion 55 and tail portion 56 is matched to the total depth 70 of the bore 45, thereby allowing the retainer 50 to be fixed inside the bore 45. Furthermore, the size of the aperture 54 and recess 65 of the aperture 54 are both selected based on the dimensions of the barrel nut 40, and the relative distance of the aperture 54 (and thereby the position of the barrel nut 40) from the head portion 55 and tail portion 56 are selected based on the desired position of the barrel nut 40 in the bore, and in particular so that the threaded through-hole of the barrel nut 40 aligns with a fastener 30.

The fastener 30 is inserted through a second bore 35 perpendicular to the first bore 45 and through the threaded through-hole in the barrel nut 40.

The fastener 30 may also pass at least part way through the through-hole 59 of the shoulder 58, although typically the space provided for by the through-hole 59 is arranged to receive egress and burrs exiting the barrel nut 40 upon the insertion of the bolt 30 into the barrel nut.

The relative positions of the aperture 54, head portion 55 and tail portion 56 each assist in ensuring the barrel nut 40 is aligned along the axial direction of the bore 45 with the fastener 30.

Figure 7B:
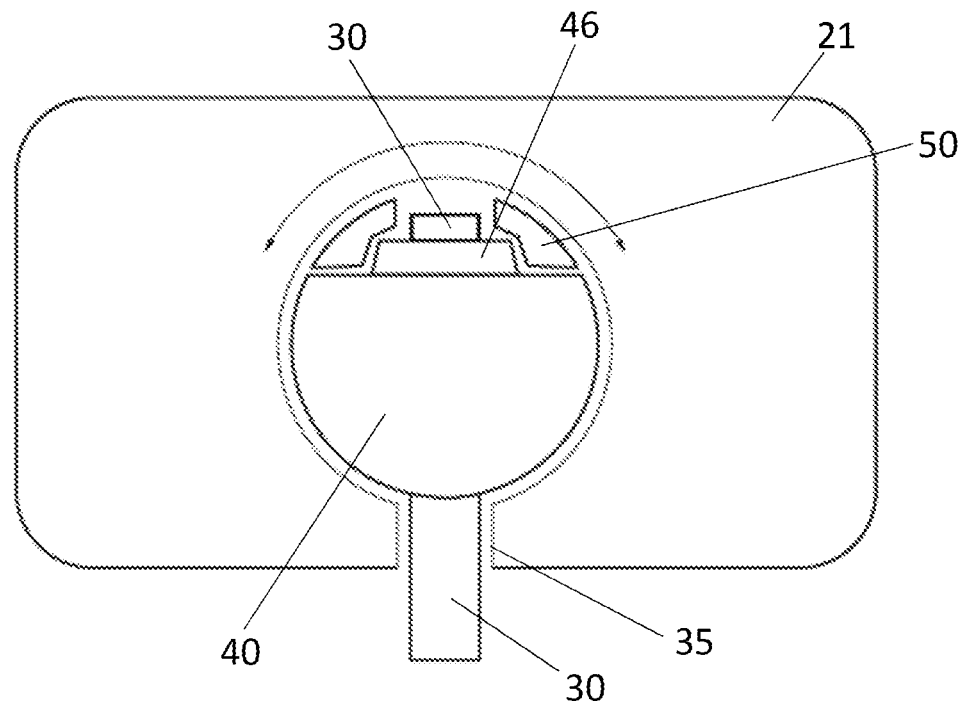
FIG. 7B shows a cross-section of the barrel nut inside a hole of the control surface actuation mechanism.

FIG. 7B shows a cross-section of the assembly taken part way between the first and second sides 21a, 21b of the component 21, in which the barrel nut 40 has been rotated to align with the fastener 30 so the fastener 30 can be passed through the threaded through-hole of the barrel nut 40.

In order to assist in aligning the barrel nut 40 with the fastener 30 rotationally, the head portion 55 includes a recess 61 (shown in FIG. 6) that is engageable with a flat head screwdriver, allowing the retainer 50 to be easily rotated within the bore 45.

The head portion 55 also includes an inscribed arrow 62, which can be used as an indication of the orientation of the barrel nut 40 retained by the barrel nut retainer 50. As such, the arrow 62 can be used as a guide to align the threaded through-hole of the barrel nut 40 with the fastener 30. In alternative examples, the orientation of the barrel nut retainer 50 may instead be indicated by any asymmetric features visible on the head portion 55. Alternatively, the retainer 50 may be blindly rotated until alignment with the fastener 30 is achieved.

Figure 8A:
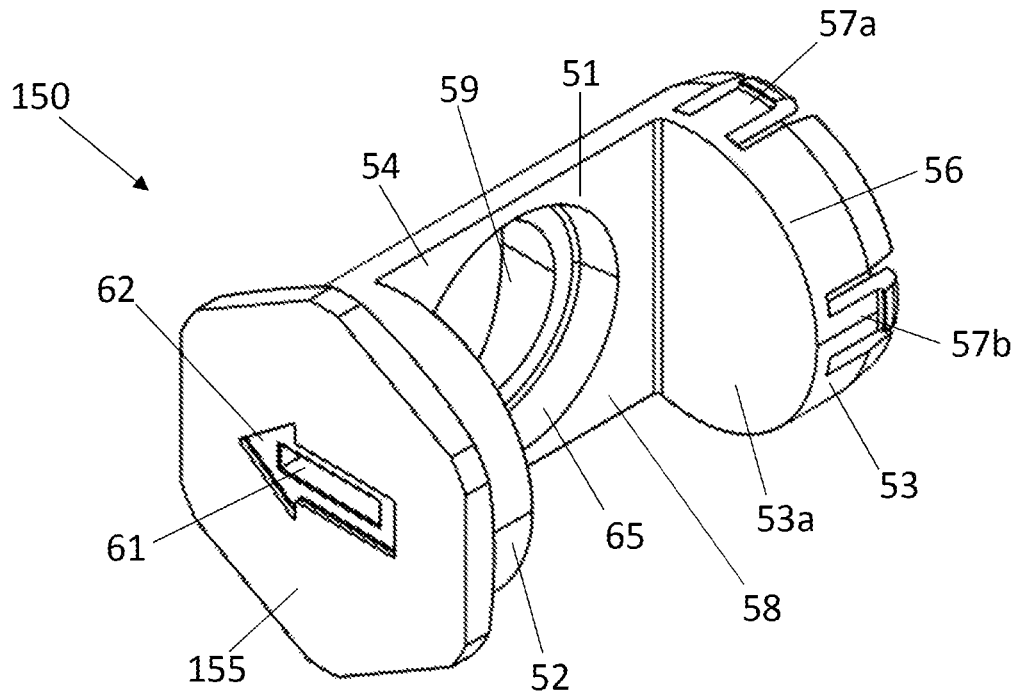
FIG. 8A shows a barrel nut retainer according to a second example.
Figure 8B:
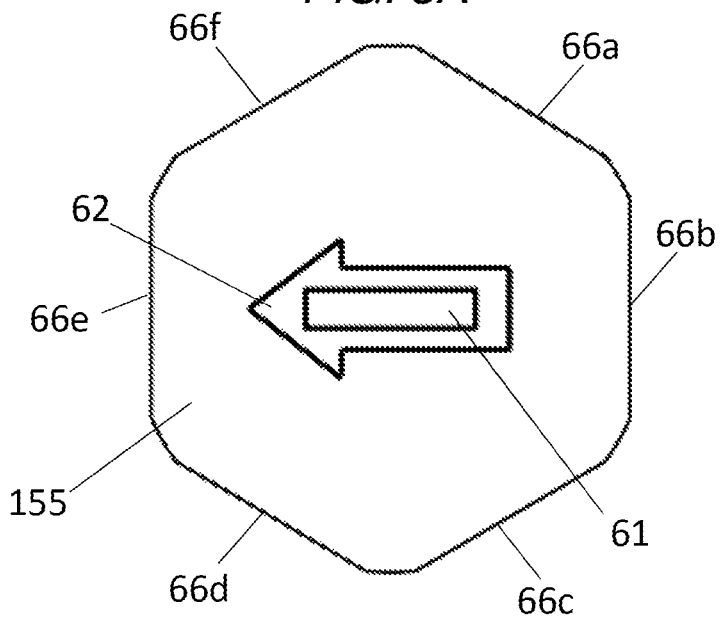
FIG. 8B shows an end view of the head portion of a barrel nut retainer according to a second example.

FIGS. 8A and 8B show a barrel nut retainer 150 according to a second example, which is substantially the same as the barrel nut retainer 50 of the first example, and in which like reference numerals are used to denote like parts with the first example and similar reference numerals but numbered in the 100 series are used to denote similar parts with the first example.

As shown in FIG. 8A, the barrel nut retainer 150 is substantially the same as the first barrel nut retainer 50. The barrel nut retainer 150 of the second example differs in that the head portion 155 is adapted to engage with, e.g., a wrench or spanner. The head portion 155 is hexagonal in profile, having six flats sides 66a, 66b, 66c, 66d, 66e, 66f radially arranged around the head portion 155, as shown in FIG. 8B.

It will be clear to the skilled person that the examples described above may be adjusted in various ways.

In alternative examples, the recess 61 may instead be suitable for engaging with a different shaped tool, or may be a protrusion providing a surface to which a tool (or user) can grip the retainer 50.

The retainer 50 is described as being formed from ABS, in alternative examples the retainer 50 may be formed of other plastics materials such as Polylactic Acid (PLA) and polycarbonate. The retainer 50 may also be formed of other materials, such as stainless steel, nickel alloys, aluminium, or any other suitable metal.

The retainer may be made by additive layer manufacturing techniques. Alternatively, the retainer may be made by fused filament fabrication (FFF), selected laser sintering (SLS), injection moulding, or any other suitable techniques.

In some examples, the clip elements 57a, 57b may not be spring clip elements 57a, 57b, and may instead be clip elements 57a, 57b that are manually moved or toggled between a first configuration sized to fit within the bore 45 and a second configuration that wedges the retainer 50 inside of the bore 45. In further examples, the retainer 45 may be suitably adapted to be inserted into a blind bore. The tail portion 56 may include one or more spring elements that open into a groove formed in the circumference of the blind bore part way along the length of the bore, so as to locate the retainer in the blind bore. The spring element may for example be a circlip, or may be similar to the clip elements 57a, 57b.

In some examples, the retainer may not be an interference fit with the bore, and instead the retainer may be designed to have some degree of movement to account for any angular misalignment of the barrel nut relative to the fastener.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A barrel nut assembly, comprising:
   a barrel nut retainer for retaining a barrel nut in a bore of a component, the retainer comprising:
   a body adapted to fit within a bore and extending between a first end and a second end, and wherein the body has an aperture between the first end and second end configured to receive a barrel nut,
   a head portion at the first end of the body, the head portion adapted to sit over an open end of the bore; and
   a barrel nut located in the aperture,
   wherein the aperture is configured to releasably engage the barrel nut, and
   wherein the aperture has dimensions configured to form an interference fit with the barrel nut.

2. The barrel nut assembly of claim 1, wherein the head portion is configured to cover the open end of the bore to prevent ingress of debris to the bore.

3. The barrel nut assembly of claim 1, wherein the head portion includes a tool engagement portion for engaging with a tool.

4. The barrel nut assembly of claim 1, wherein the head portion includes an orientation indicator for indicating the orientation of a barrel nut retained by the retainer with respect to the bore.

5. The barrel nut assembly of claim 1, wherein the barrel nut retainer comprises plastics material.

6. The barrel nut assembly of claim 1, wherein the retainer is integrally formed, preferably as a single component.

7. An assembly, comprising:
   a component with a first bore and a second bore perpendicular to the first bore,
   the barrel nut assembly of claim 1 insertable into the first bore, and
   a bolt insertable into the second bore to threadingly engage with a threaded through-hole in the barrel nut.

8. The assembly of claim 7,
   wherein the component has a pair of opposing faces and the first bore is a through-hole extending between the pair of opposing faces,
   wherein the head portion and the tail portion are each configured to engage a respective one of the pair of opposing faces.

9. The assembly of claim 7, wherein the assembly is an aircraft assembly and the component is an aircraft component, or wherein the assembly is an automotive assembly and the component is an automotive component.

10. A method for assembling an aircraft assembly, comprising:
    providing a first component having a first bore and a second bore perpendicular to the first bore and intercepting the first bore at a depth of the first bore,
    selecting the barrel nut assembly of claim 1, wherein the barrel nut retainer is selected based on the depth of the first bore at which the second bore intercepts the first bore,
    inserting the barrel nut assembly into the first bore until the head portion of the retainer sits over an open end of the first bore and a threaded through-hole of the barrel nut aligns with the second bore.

11. A method of manufacturing the barrel nut assembly of claim 1, comprising:
    forming the barrel nut retainer by additive layer manufacturing or injection moulding.

12. A barrel nut retainer for retaining a barrel nut in a bore of a component, the retainer comprising:
    a body adapted to fit within a bore and extending between a first end and a second end, and wherein the body has an aperture between the first end and second end configured to receive a barrel nut, and
    a head portion at the first end of the body, the head portion adapted to sit over an open end of the bore,
    wherein the body includes a shoulder extending between the first and second ends of the body, wherein the shoulder includes a through-hole perpendicular to a longitudinal axis extending between the first and second ends of the body, the through-hole configured to align with a corresponding threaded through-hole of the barrel nut.

13. The barrel nut retainer of claim 12, wherein the through-hole is equidistant from the first and second ends of the body.

14. A barrel nut retainer for retaining a barrel nut in a bore of a component, the retainer comprising:
    a body adapted to fit within a bore and extending between a first end and a second end, and wherein the body has an aperture between the first end and second end configured to receive a barrel nut,
    a head portion at the first end of the body, the head portion adapted to sit over an open end of the bore, and
    wherein the aperture includes a recess for receiving a protrusion of a barrel nut.

15. A barrel nut retainer for retaining a barrel nut in a bore of a component, the retainer comprising:
    a body adapted to fit within a bore and extending between a first end and a second end, and wherein the body has an aperture between the first end and second end configured to receive a barrel nut,
    a head portion at the first end of the body, the head portion adapted to sit over an open end of the bore, and
    a tail portion at the second end of the body, wherein the tail portion includes a clip.

16. The barrel nut retainer of claim 15, wherein the clip is configured to move between:
    a first configuration in which the diameter of the clip is substantially the same or less than the diameter of the body such that the retainer is moveable through the bore, and
    a second configuration in which the diameter of the clip is greater than the diameter of the body such that the tail portion is operable to locate the retainer with respect to the bore.

17. The barrel nut retainer of claim 16, wherein the clip is a spring clip biased towards the second configuration.

18. The barrel nut retainer of claim 16, wherein the clip in the second configuration is adapted to sit over a second open end of the bore opposing the first open end.

* * * * *